United States Patent
Aaron et al.

(10) Patent No.: US 9,587,885 B2
(45) Date of Patent: Mar. 7, 2017

(54) COOLING TOWER WITH INDIRECT HEAT EXCHANGER

(71) Applicant: Baltimore Aircoil Company, Inc., Jessup, MD (US)

(72) Inventors: David Andrew Aaron, Reisterstown, MD (US); Zan Liu, Clarksville, MD (US); Branislav Korenic, Columbia, MD (US); John Edward Rule, Mooney Mooney (AU); Preston P. Blay, Silver Spring, MD (US); Philip S. Hollander, Silver Spring, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 14/738,132

(22) Filed: Jun. 12, 2015

(65) Prior Publication Data

US 2016/0363376 A1    Dec. 15, 2016

Related U.S. Application Data

(60) Provisional application No. 62/061,894, filed on Oct. 9, 2014.

(51) Int. Cl.
| | | |
|---|---|---|
| *B01F 3/04* | (2006.01) | |
| *F28C 1/14* | (2006.01) | |
| *F28D 5/02* | (2006.01) | |
| *F28D 7/08* | (2006.01) | |
| *F28F 25/04* | (2006.01) | |
| *F28F 25/06* | (2006.01) | |
| *F28F 25/12* | (2006.01) | |

(52) U.S. Cl.
CPC ............ *F28C 1/14* (2013.01); *B01F 3/04014* (2013.01); *B01F 3/04021* (2013.01); *B01F 3/04078* (2013.01); *F28D 5/02* (2013.01); *F28D 7/082* (2013.01); *F28D 7/085* (2013.01); *F28F 25/04* (2013.01); *F28F 25/06* (2013.01); *F28F 25/12* (2013.01); *F28F 2250/08* (2013.01)

(58) Field of Classification Search
CPC .... B01F 3/04; B01F 3/04014; B01F 3/04021; B01F 3/04078; F28C 1/14; F28D 7/085
USPC ............ 261/151, 152, 154, DIG. 1, DIG. 11, 261/DIG. 77
See application file for complete search history.

(56) References Cited

U.S. PATENT DOCUMENTS 3,169,575 A * 2/1965 Engalitcheff, Jr. ....... F28D 5/02
165/143

\* cited by examiner

*Primary Examiner* — Robert A Hopkins
(74) *Attorney, Agent, or Firm* — Edward J. Brosius

(57) ABSTRACT

A heat exchange apparatus is provided with an indirect evaporative heat exchange section. The indirect evaporative heat exchange section is comprised of a series of serpentine tubes, and an evaporative liquid is passed downwardly onto the indirect heat exchange section. The evaporative liquid is collected in a sump and then pumped upwardly to be distributed again across the indirect heat exchange section. An improved heat exchange apparatus is provided with an indirect evaporative heat exchange section consisting of a series of serpentine tubes comprised of tube runs both of normal and increased height between tube runs. A direct heat exchange section may be provided in the increased vertical spacing between tube runs.

27 Claims, 9 Drawing Sheets

6a      6b

COOLING TOWER WITH INDIRECT HEAT EXCHANGER

RELATED APPLICATIONS

The application claims the benefit of U.S. provisional application 62/061,894, filed Oct. 9, 2014, the entirety of which is hereby incorporated herein by reference.

BACKGROUND OF THE INVENTION

The present invention relates generally to an improved heat exchange apparatus such as a closed circuit fluid cooler, fluid heater, condenser, evaporator, thermal storage system, air cooler or air heater. More specifically, the present invention relates to a combination or combinations of separate indirect and direct evaporative heat exchange sections or components arranged to achieve improved capacity, improved performance and reduced scale formation on the surfaces of the indirect heat exchanger.

The invention includes the use of a coil type heat exchanger as an indirect heat exchange section. Such indirect heat exchange section can be combined with a direct heat exchange section, which usually is comprised of a fill section over which an evaporative liquid such as water is transferred, usually in a downwardly flowing operation. Such combined indirect and direct heat exchange sections together provide improved performance as an overall heat exchange apparatus such as a closed circuit fluid cooler, fluid heater, condenser, evaporator, air cooler or air heater.

Part of the improved performance of the indirect heat exchange section comprising a coil type heat exchanger is the capability of the indirect heat exchange section to provide both sensible and latent heat exchange with the evaporative liquid which is streamed or otherwise transported downwardly over and through the indirect heat exchange section. Such indirect heat exchangers are usually comprised of a series of serpentine tube runs with each tube run providing a circuit of a coil. Improved performance of such indirect heat exchangers is achieved by opening the spacing between the generally horizontal tube runs in one or more of the serpentine coil return bends. Such opened spacing in the serpentine coil return bends creates a more efficient cooling zone for the evaporative liquid flowing downwardly over the serpentine coils.

Various combinations of the heat exchange arrangements are possible in accordance with the present invention. Such arrangements could include an arrangement having an indirect heat exchange section with increased vertical spacing in the series of serpentine tube runs formed by increased height return bends. In such an arrangement, an evaporative liquid flows downwardly onto and through the indirect heat exchange section with such evaporative liquid, which is usually water, then exiting the indirect section to be collected in a cold water sump and then pumped upwardly to again be distributed downwardly over the indirect heat exchange section. In this counterflow arrangement, embodiments work more efficiently with generally lower spray flow rates, in the order of 2-4 GPM/sq. ft. In other arrangements presented, the design spray flow rates may be higher.

In another arrangement, a combined heat exchange apparatus is provided with an indirect heat exchange section comprised of serpentine tube runs over which and evaporative liquid is distributed downwardly onto and through the indirect heat exchange section. Such indirect heat exchange sections are comprised of serpentine tube runs having an increased spacing between one or more return bends of increased height. Further, a direct heat exchange section comprised of fill can be located in one or more of the areas of increased vertical spacing formed by the return bends of the serpentine coil. In this arrangement, the embodiments work more efficiently with generally lower spray flow rates, in the order of 2-4 GPM/sq. ft. The embodiments presented are more efficient providing increased heat rejection and also do it with less energy requirement for the spray water pump. In other arrangements presented, the design spray flow rates may be higher.

The heat exchanger apparatus, condenser or fluid cooler of the present invention could be operated wherein both air and an evaporative liquid such as water are drawn or supplied across both the indirect and direct heat exchange section if present. It may be desirable to operate the heat exchanger without a supply of the evaporative liquid, wherein air only would be drawn across the indirect heat exchange section and across a direct section if present. It is also possible to operate a combined heat exchanger in accordance with the present invention wherein only evaporative liquid would be supplied across or downwardly through the indirect heat exchange section and the direct heat exchange section if present, and wherein air would not be drawn by typical means such as a fan or the fan may be turned off.

In the operation of an indirect heat exchange section, a fluid stream passing through the internal side of the serpentine coils is cooled, heated, condensed, or evaporated in either or both a sensible heat exchange operation and a latent heat exchange operation by passing an evaporative liquid such as water together with air over the serpentine coils of the indirect heat exchange section. Such combined heat exchange results in a more efficient operation of the indirect heat exchange section, as does the presence of the increased spacing formed in one or more of the return bends of the serpentine tube runs of the indirect heat exchange section. The evaporative liquid is usually water and passes generally downwardly through the indirect heat exchange section and generally downwardly through the direct heat exchange section if present. The direct section, which is typically a fill assembly, is located in the increased vertical spacing in one or more of the increased height return bends of the serpentine coils of the indirect heat exchange section. Heat in the evaporative liquid is passed to air which is drawn generally passing upwardly or in some cases generally downwardly through the indirect heat exchange section and outwardly from the closed circuit fluid cooler or heat exchanger assembly by an air moving system such as a fan. The evaporative liquid draining from the indirect or direct heat exchange section is typically collected in a sump and then pumped upwardly for redistribution across the indirect or direct evaporative heat exchange section.

The type of fan system whether induced or forced draft, belt drive, gear drive or direct drive can be used with all embodiments presented. The type of fan whether axial, centrifugal or other can be used with all embodiments presented. All type of tubes, material of tubes, tube diameters, tube shapes, tube enhancements, tube fins, can be used with all the embodiments presented. Further, the number of tube passes, number of return bends, number of increased vertical spaces are limitations of the embodiments presented. Further, the coil may consist of tubes or may be a plate fin type or may be any type of plates in any material which can be used with all embodiments presented within. The type of fill, whether efficient counterflow fill, contaminated water application fills or any material fill can be used with all embodiments presented.

Extensive testing conducted has shown that in addition to the benefits of providing more cooling of the spray water in the large spray water cooling zones, the direct heat exchange surface located within the confines of the indirect heat exchange section, evaporates a considerable amount of water compared to that in the indirect section and accordingly prevents at least partially the scale from building on surfaces of indirect coil.

Accordingly, it is an object of the present invention to provide an improved heat exchange apparatus, which could be a closed circuit fluid cooler, fluid heater, condenser, evaporator, air cooler or air heater, which includes an indirect heat exchange section with increased spacing formed in one or more return bends of the serpentine tube forming the indirect heat exchange section.

It is another object of the present invention to provide an improved heat exchange apparatus such as a closed circuit fluid cooler, fluid heater, condenser, evaporator, air cooler or air heater, including an indirect heat exchange section that comprises a series of serpentine tube runs with increased vertical spacing between one or more of the tube runs and with a direct heat exchange section located in one or more of the areas of increased vertical spacing.

It is another object of the present invention to provide an improved evaporative heat exchange apparatus such as a closed circuit fluid cooler, fluid heater, condenser, evaporator, air cooler or air heater, including at least two indirect heat exchange sections that comprise a series of serpentine tube runs with increased vertical spacing between one or more tube runs and with a direct heat exchange located in one or more of the areas of increased vertical spacing between tube runs.

It is another object of the present invention to provide an improved evaporative heat exchange apparatus such as a closed circuit fluid cooler, fluid heater, condenser, evaporator, air cooler or air heater, including at least two indirect heat exchange sections separated by an increased vertical spacing with an optional direct heat exchange located in the increased vertical space between indirect heat exchange sections.

It is another object of the present invention to provide an improved evaporative heat exchange apparatus such as a closed circuit fluid cooler, fluid heater, condenser, evaporator, air cooler or air heater, including at least two indirect heat exchange sections separated by an increased vertical spacing where the indirect heat exchangers are connected with vertical tube runs in lieu of external piping such that a direct heat exchange may be located in the increased vertical space between indirect heat exchange sections.

It is another object of the present invention to provide an improved evaporative heat exchange apparatus such as a closed circuit fluid cooler, fluid heater, condenser, evaporator, air cooler or air heater, where direct heat exchange sections located in one or more of the areas of increased vertical spacing between tube runs or alternatively located between increased vertical space between indirect heat exchange sections are easily accessible and replaceable for serviceability.

It is another object of the present invention to provide an improved evaporative heat exchange apparatus such as a closed circuit fluid cooler, fluid heater, condenser, evaporator, air cooler or air heater, where direct heat exchange sections located in one or more of the areas of increased vertical spacing between tube runs or alternatively located between increased vertical space between indirect heat exchange sections evaporates a considerable amount of water compared to that in the indirect section and accordingly prevents at least partially the scale from building on surfaces of indirect coil.

SUMMARY OF THE INVENTION

The present invention provides an improved heat exchange apparatus which typically is comprised of an indirect heat exchange section. The indirect heat exchange section provides improved performance by utilizing a serpentine coil arrangement comprised of tube run sections and return bends, with a means of increasing the distance between one or more of the tube runs of the serpentine coils. One way to accomplish this vertical separation between the generally horizontal or sloped tube runs is by increasing one or more of the return bend radius in the return bends of the serpentine tube runs in the serpentine coil or by using two 90 degree bends separated by a vertical tube run. Another way to accomplish this vertical separation between generally horizontal or sloped tube runs is to install a purposeful vertical spacing between two or more serpentine coils or other indirect heat exchange sections such as plate heat exchangers. Another way to accomplish this vertical separation between generally horizontal or sloped tube runs is to have at least one short return bend which is less than 180 degrees allowing the tubes to be sloped such that a marked higher distance between the indirect tubes is accomplished which allows a generally triangular shaped direct heat exchange section.

The tube run sections of the serpentine coil arrangement may be generally horizontal and can be slanted downwardly from the inlet end of the coils toward the outlet end of the coils to improve flow of the fluid stream there through. Such serpentine coils are designed to allow a fluid stream to be passed there through, exposing the fluid stream indirectly to air or an evaporative liquid such as water, or a combination of air and an evaporative liquid, to provide both sensible and latent heat exchange from the outside surfaces of the serpentine coils of the indirect heat exchanger. Such utilization of an indirect heat exchanger in the closed circuit fluid cooler, fluid heater, condenser, evaporator, air cooler or air heater of the present invention provides improved performance and also allows for combined operation or alternative operation wherein only air or only an evaporative liquid or a combination of the two can be passed through or across the outside of the serpentine coils of the indirect heat exchanger.

A direct heat exchange section or sections can be located generally within the indirect heat exchange section in the vertical spacing between the increased height return bends of the generally horizontal tube runs of the serpentine coil. Accordingly, the evaporative liquid is allowed to pass across and through the indirect and direct sections comprising the heat exchange section. Heat is drawn from such evaporative liquid by a passage of air across or through the indirect and direct heat exchange sections by air moving apparatus such as a fan. Such evaporative liquid is collected in a sump in the bottom of closed circuit fluid cooler, fluid heater, condenser, evaporator, air cooler or air heater and pumped back for distribution, usually downwardly, across or through the indirect heat exchange section.

BRIEF DESCRIPTION OF THE DRAWINGS

In the drawings,

FIG. 7a is a side view of an embodiment having a generally rectangular direct section FIG. 7b is a side view of an embodiment having a generally triangular direct section FIG. 7c is a side view of an embodiment having a generally rectangular direct section

DESCRIPTION OF THE PREFERRED EMBODIMENT

Figure 1:
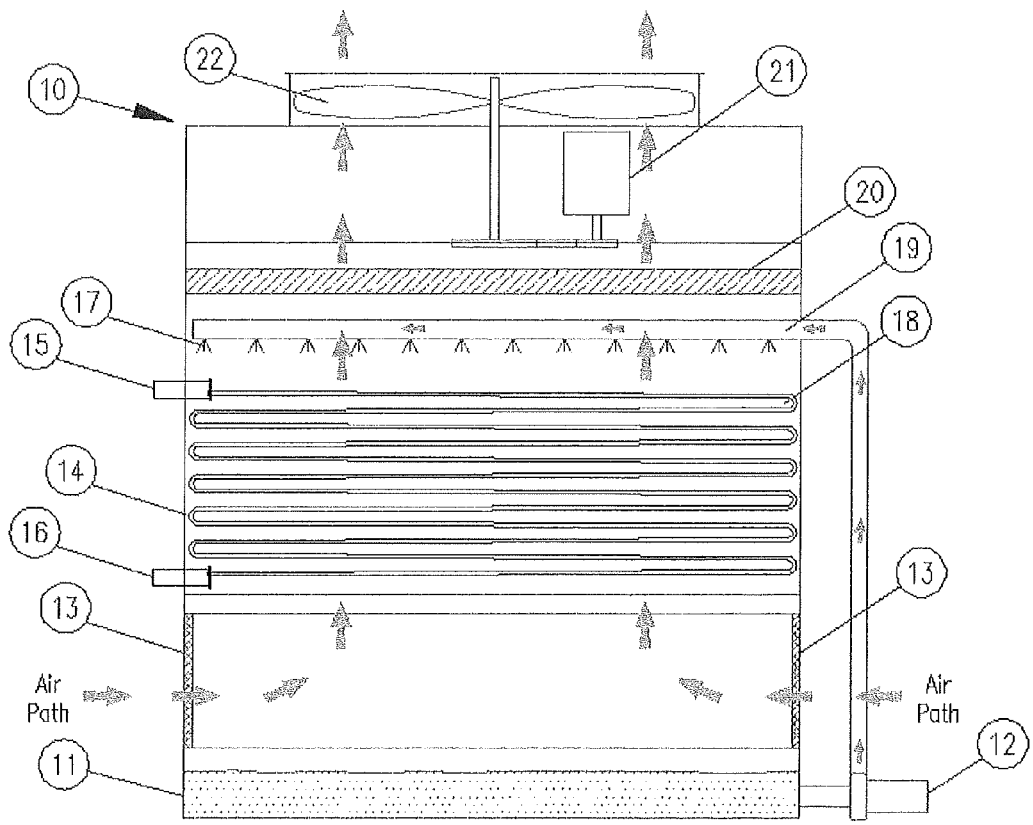
FIG. 1 is a side view of a prior art indirect heat exchanger including a series of serpentine tube runs.

Referring now to FIG. 1, a prior art evaporatively cooled coil product 10 which could be a closed circuit cooling tower or an evaporative condenser. Both of these products are well known and can operate wet in the evaporative mode or can operate dry, with the spray pump 12 turned off when ambient conditions or lower loads permit. Pump 12 receives the coldest cooled evaporatively sprayed fluid, usually water, from cold water sump 11 and pumps it to spray water header 19 where the water comes out of nozzles or orifices 17 to distribute water over indirect coil 14. Spray water header 19 and nozzles 17 serve to evenly distribute the water over the top of the coil(s) 14. As the coldest water is distributed over the top of coil 14, motor 21 spins fan 22 which induces or pulls ambient air in through inlet louvers 13, up through coil 14, then through drift eliminators 20 which serve to prevent drift from leaving the unit, and then the warmed air is blown to the environment. The air is generally flowing in a counterflow direction to the falling spray water. Although FIG. 1 and all following Figures are shown with axial fan 22 inducing or pulling air through the unit, the actual fan system may be any style fan system that moves air through the unit including but not limited to induced and forced draft. Additionally, motor 21 may be belt drive as shown, gear drive or directly connected to the fan. It should be understood that in all the embodiments presented, there are many circuits in parallel with tube runs but only the outside circuit is shown for clarity. Indirect coil 14 is shown with an inlet header 15 and outlet header 16 which connects to all the serpentine tubes having normal height return bend sections 18. It should be further understood that the number of circuits or number of return bends within a serpentine coil is not a limitation to embodiments presented.

Figure 2:
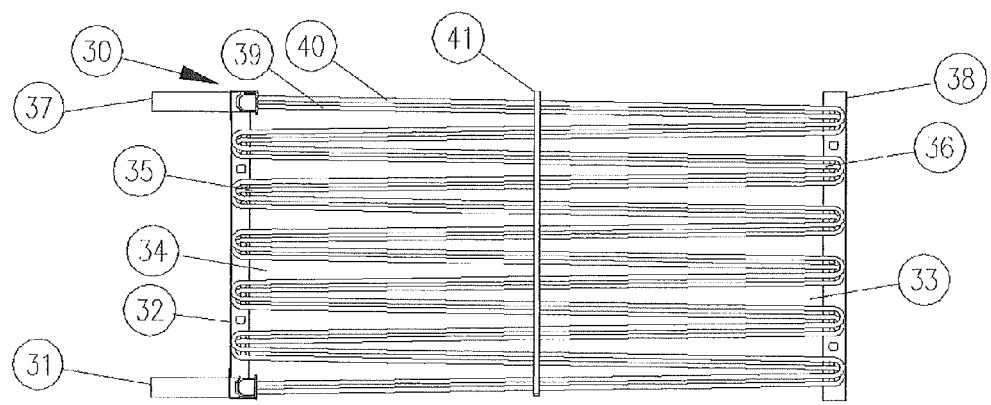
FIG. 2 is a side view of a prior art indirect heat exchanger serpentine coil.

Referring now to FIG. 2, prior art coil 30 has inlet and outlet headers 37 and 31 respectively, is supported by coil clips 32 and 38 with center support 41. There are two circuits coming out of the inlet header shown as generally horizontal tube runs 39 and 40. Coil 30 is built with short radius or normal return bends 36 with a small slope to allow for proper drainage. In some prior art coils, this slope of the generally horizontal tube runs can vary with the last set of tube runs on the bottom having more slope. The spacing 35 between tube runs on the left side can be seen as nearly zero and accordingly allows very little interaction between the falling spray water and generally counter flowing air before the spray water hits the next set of tube runs. Similarly, the space 33 and 34 between generally horizontal tube runs is seen as a little larger but still there is insufficient interaction between the falling spray water and generally counter flowing air before the spray water hits the next set of tube runs compared to the embodiments presented within. In addition, there is not enough room in gaps 33, 34 or 35 to install a direct heat exchange section such as counterflow fill to further increase the spray water cooling such as the embodiments presented within.

Figure 3:
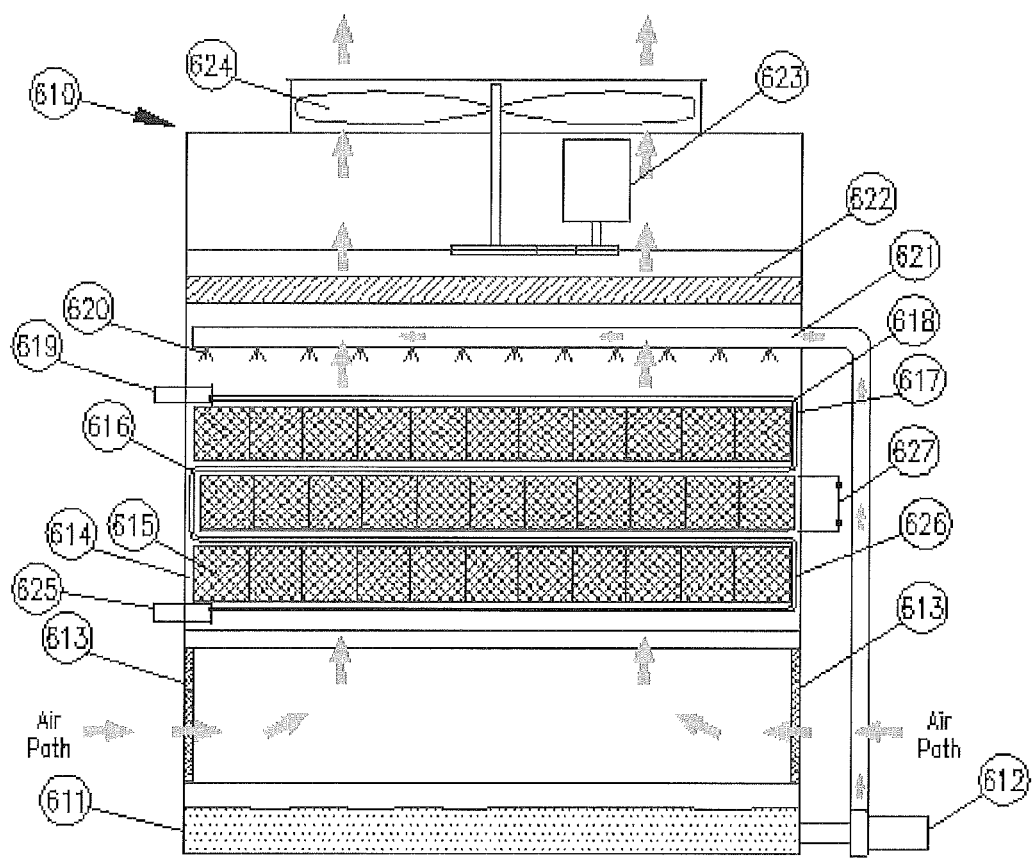
FIG. 3 is a side view of a first embodiment of an indirect heat exchanger with a series of serpentine tube runs with direct heat exchange sections in accordance with the present invention

Referring now to FIG. 3, a cooling tower in accordance with a first embodiment is shown at 610. In this embodiment, air enters through air inlet louvers 613, passes generally upwards through the indirect and heat exchanger 616 and also passes through optional direct heat exchanger 615 then passes through drift eliminators 622 then through fan 624 driven by fan motor 623. At the same time, when wet evaporative operation is desired, water is pumped from cold water sump 611 by pump 612 to spray header 621 and out of nozzles 620 to spray onto the top of the indirect heat exchange surface 616. Operation of the spray pump may be omitted during dry operation. Optionally, spray pump 612 may operate without fan motor 623 operating when desired, or with fan motor 623 operating between 0 to 100% speed, as known in the art. Indirect section inlet header connection 619 and outlet header connection 625 are piped to the indirect section process fluid accordingly.

In this embodiment of FIG. 3, all of the indirect heat exchanger tubes in coil 616 are separated by a large vertical distance such that 627, the distance between the tubes and room for the direct surface 615, is at least 2" in height. Note that the large distance between tubes of indirect surface 627 of at least 2" forms a large spray water cooling zone 614 in coil 616. In this embodiment, direct section 615 may be omitted or may contain one or greater number of direct heat exchange sections 615. Further, direct sections 615 may be removed for cleaning or replacement as required. Direct heat exchange section 615 can be counterflow fill which is installed inside the large spray water cooling zone 614. Direct section 615 increases the efficiency of the cooling of the spray water within the large spray water cooling section 614. In this embodiment, there are repeating sets of indirect tube runs or passes with large radius bends 626. Alternatively, the vertical separation between tube runs may be formed with two 90 degree bends 618 separated by vertical run 617. The large separation between tube runs 627 form three large spray water cooling zones 614 to exist within the confines of the coil. In this case, up to three direct sections 615 can be used if desired as shown. The efficiency gained in further cooling the spray water between the tubes in cooling zones 614 far exceeds the loss of airflow from the added direct sections or fill decks 615 to apparatus 610. The type of direct section can be counterflow fill, contaminated water fill or any substrate that increases the surface area of the spray water within the large spray water cooling zone 614. It should be noted that the tube runs in coil 616 are shown as horizontal for clarity but can be sloped or slanted as known in the art. It should be noted that the number of tube runs between large spray water cooling zones, the number of large spray water cooling zones, number of total tube runs, the height of large spray water cooling zone can all be varied to optimize performance and unit height.

Figure 4:
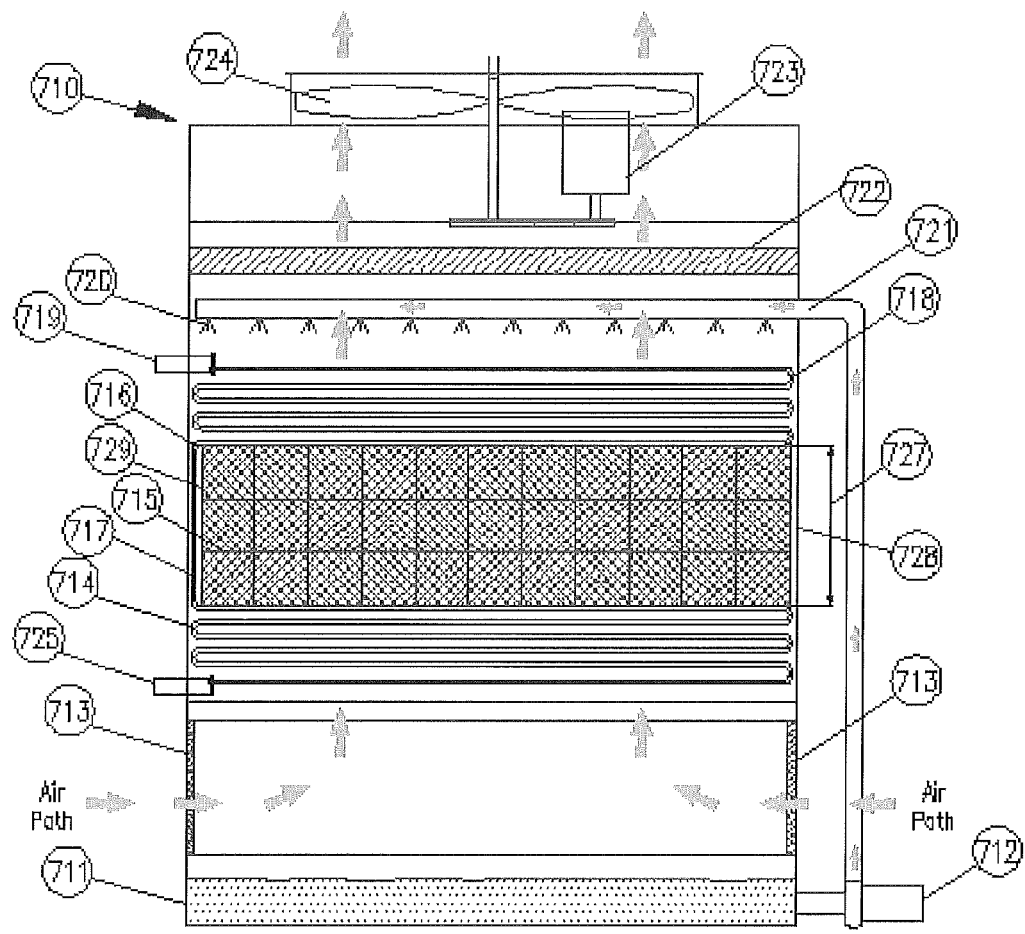
FIG. 4 is a side view of a second embodiment of an indirect heat exchanger with a series of serpentine tube runs with direct heat exchange sections in accordance with the present invention

Referring now to FIG. 4, a cooling tower in accordance with a second embodiment is shown at 710. In this embodiment, air enters through air inlet louvers 713, passes generally upwards through the indirect and heat exchanger 714 and also optional direct heat exchanger 715 then passes through drift eliminators 722 then through fan 724 driven by fan motor 723. At the same time, when desired, water is pumped from sump cold water 711 by pump 712 to spray header 721 and out of nozzles 720 to spray onto the top of the indirect heat exchange surface 714. Operation of the spray pump may be omitted during "dry operation". Optionally, spray pump 712 may operate without fan motor 723 operating, or with fan motor 723 operating between 0 to 100% speed, when desired as known in the art. Indirect section inlet header connection 719 and outlet header connection 725 are piped to the indirect section process fluid accordingly.

In the embodiment of FIG. 4, all of the top and bottom indirect heat exchanger tubes have multiple short return radius bends 718 followed by at least one extraordinarily long radius return bend 729 which allows 727, the distance between the tubes and room for the direct surface 715, to be at least 2" in height. Alternatively, the large separation between tube runs may be formed with two 90 degree bends 716 separated by vertical run 717. Note that the large distance between tubes of indirect surface 727 forms a large spray water cooling zone 728 in coil 714. In this embodiment, direct section 715 may be omitted or may contain one or greater number of direct heat exchange sections 715. Further, direct sections 715 may be removed for cleaning or replacement as required. Direct heat exchange section 715 can be counterflow fill which is installed inside the large spray water cooling zone 728. Direct section 715 increases the efficiency of the cooling of the spray water within the large spray water cooling section 728. The efficiency gained in further cooling the spray water between the tubes 727 far exceeds the loss of airflow from the added direct sections or fill decks 715 to apparatus 710. The type of direct section can be counterflow fill, contaminated water fill or any substrate that increases the surface area of the spray water within the large spray water cooling zone. It should be noted that the tube runs in coil 714 are shown as horizontal for clarity but can be sloped or slanted as known in the art. It should be noted that the number of tube runs between large spray water cooling zones 728, the number of large spray water cooling zones, number of total tube runs, number of circuit feeds, the height of large spray water cooling zone can all be varied to optimize performance and unit height. The embodiment in FIG. 4 allows for a central location for the direct section or sections for ease of manufacturing and for ease of serviceability. The embodiment also uses the vertical tube runs 717 to connect the top short radius bend indirect heat exchanger to the bottom short radius return bend indirect heat exchange.

Figure 5:
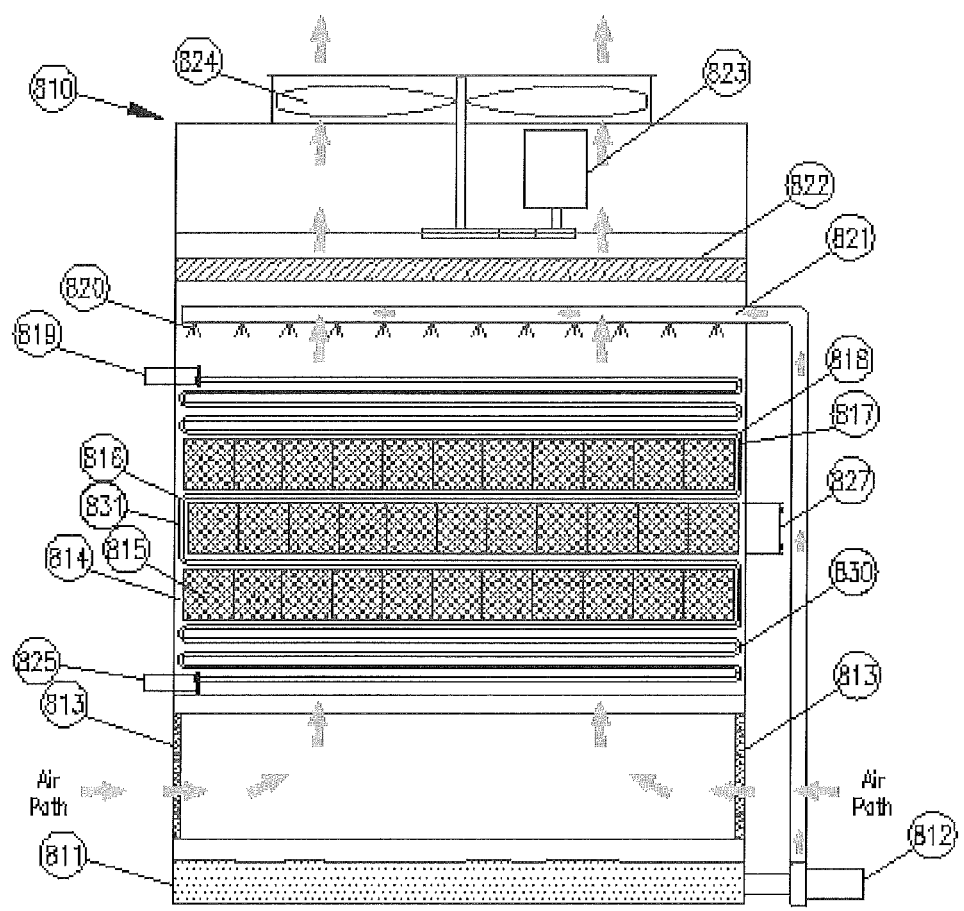
FIG. 5 is a side view of a third embodiment of an indirect heat exchanger with a series of serpentine tube runs with direct heat exchange sections in accordance with the present invention FIG. 6 includes FIGS. 6a and 6b.

Referring now to FIG. 5, a cooling tower in accordance with a third embodiment is shown at 810. In this embodiment, air enters through air inlet louvers 813, passes generally upwards through the indirect heat exchanger 818 and also optional direct heat exchanger 815 then passes through drift eliminators 822 then through fan 824 driven by fan motor 823. At the same time, when desired, water is pumped from cold water sump 811 by pump 812 to spray header 821 and out of nozzles 820 to spray onto the top of the indirect heat exchange surface 830. Operation of the spray pump may be omitted during "dry operation". Optionally, spray pump 812 may operate without fan motor 823 operating, or with fan motor 823 operating between 0 to 100% speed, when desired as known in the art. Indirect section inlet header connection 819 and outlet header connection 825 are piped to the indirect section process fluid accordingly.

In the embodiment of FIG. 5, the indirect heat exchanger tubes have a combination of at least two consecutive short return bends 830 with at least two consecutive long return bends which allows 827, the distance between the tubes and room for the direct surface 815, to be at least 2" in height. Alternatively, the large separation between tube runs may be formed with two 90 degree bends 816 separated by vertical tube run 831. Note that the large distance between tubes of indirect surface 827 forms a large spray water cooling zone 814 in coil 818. In this embodiment, direct section 815 may be omitted or may contain one or greater number of direct heat exchange sections 815. Further, direct sections 815 may be removed for cleaning or replacement as required. Direct heat exchange section 815 can be counterflow fill which is installed inside the large spray water cooling zone 814. Direct section 815 increases the efficiency of the cooling of the spray water within the large spray water cooling section 814. The efficiency gained in further cooling the spray water in direct section 815 far exceeds the loss of airflow from the added direct sections or fill decks 815 to apparatus 810. The type of direct section can be counterflow fill, contaminated water fill or any substrate that increases the surface area of the spray water within the large spray water cooling zone. It should be noted that the tube runs in coil 818 are shown as horizontal for clarity but can be sloped or slanted as known in the art. It should be noted that the number of tube runs between large spray water cooling zones 827, the number of large spray water cooling zones, number of total tube runs, the height of large spray water cooling zone can all be varied to optimize performance and unit height.

Figure 6:
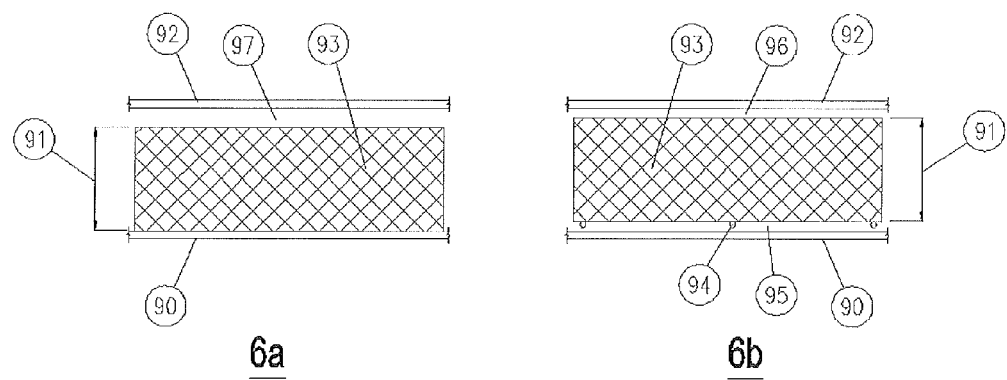
FIG. 6a is a side view of an embodiment where the direct section rests on top of the indirect section
FIG. 6b is a side view of an embodiment where the direct section is supported such that it does not touch the indirect section.

Referring now to FIG. 6, the method of mounting the direct heat exchange section within the indirect tube runs of the three embodiments presented is discussed. In FIG. 6a, direct section 93 rests on and is supported by indirect surface 90 such that there is no space between 90 and 93 while space 97 is sufficient to allow direct heat exchange surface 93 to be installed and removed for service or replacement. It should be noted that height 91 between indirect tubes 90 and 92 is at least 2" inches in height for all embodiments. In FIG. 6b, direct section 93 rests on and is supported by support means 94 and does not directly touch indirect surface 90 or 92 forming spacing 95 and 96 such that direct surface 93 can be installed and removed for service or replacement. It should be noted that height 91 between support means 94 and indirect tube 92 is at least 2" inches in height for all embodiments.

Figure 7:
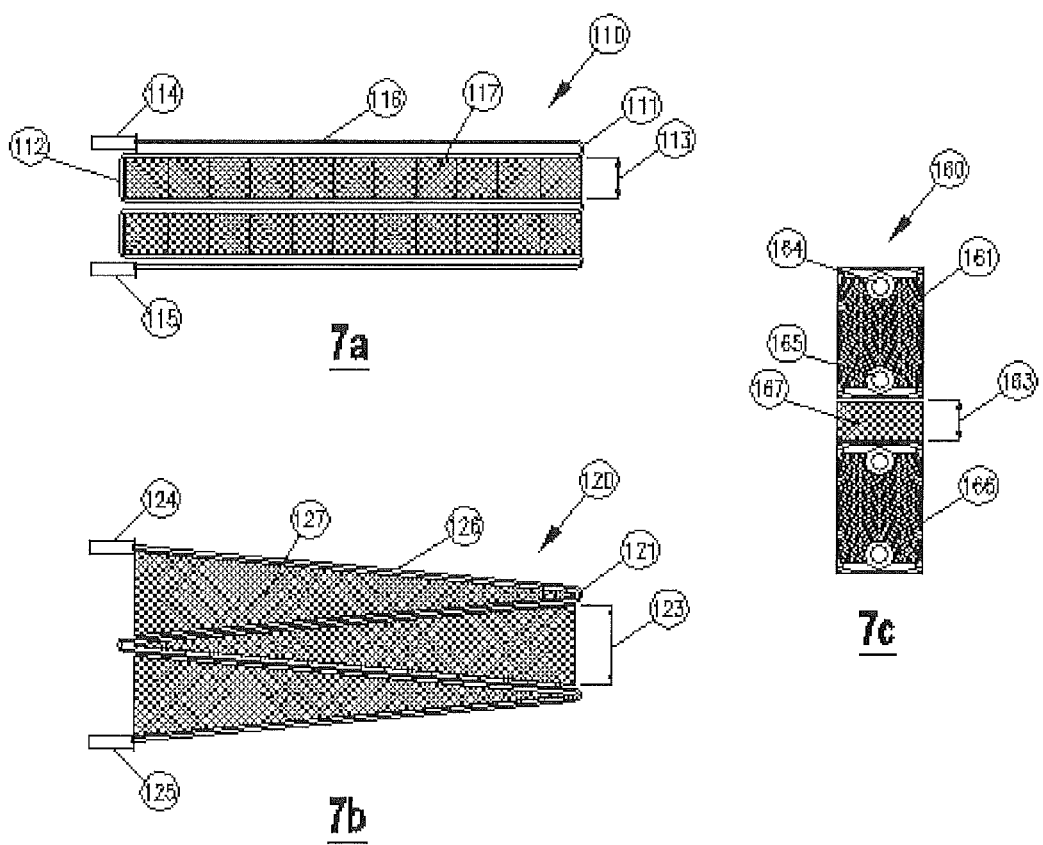
FIG. 7 includes FIGS. 7a, 7b and 7c.

Referring now to FIG. 7, the height and shape of the direct heat exchange surface is discussed relative to the indirect heat exchange design. In FIG. 7a, heat exchange section 110 with indirect inlet and outlet pipes 114 and 115, consists of multiple indirect serpentine tubes with at least one short radius return bend 111 and at least one longer return bend 112 such that 113, the distance between the indirect tubes on the longer return bends is at least 2" in height. This allows generally rectangular shaped direct heat exchange section 117 to be at least 2" in height. In FIG. 7b, heat exchange section 120 with indirect inlet and outlet pipes 124 and 125, consists of multiple indirect serpentine tubes 126 with at least one short return bend 121 which is less than 180 degrees allowing the tubes to be sloped such that 123, the highest distance between the indirect tubes is at least 2" in height. This allows generally triangular shaped direct heat exchange section 127 to be at least 2" in height at the base. In FIG. 7c, heat exchange section 160 with indirect inlet and outlet pipes 164 and 165, consists of multiple indirect heat exchange plates 161 such that 163, the distance between indirect plates 161 and 166 is at least 2" in height. This allows generally rectangular shaped direct heat exchange section 167 to be at least 2" in height.

It should be noted that the desired minimum height of each direct heat exchange section in all the embodiments is at least 2" (5.08 cm) in height, usually not more than 60 inches ((152.4 cm) in height with the preferred height being 12 inches (30.48 cm).

Figure 8:
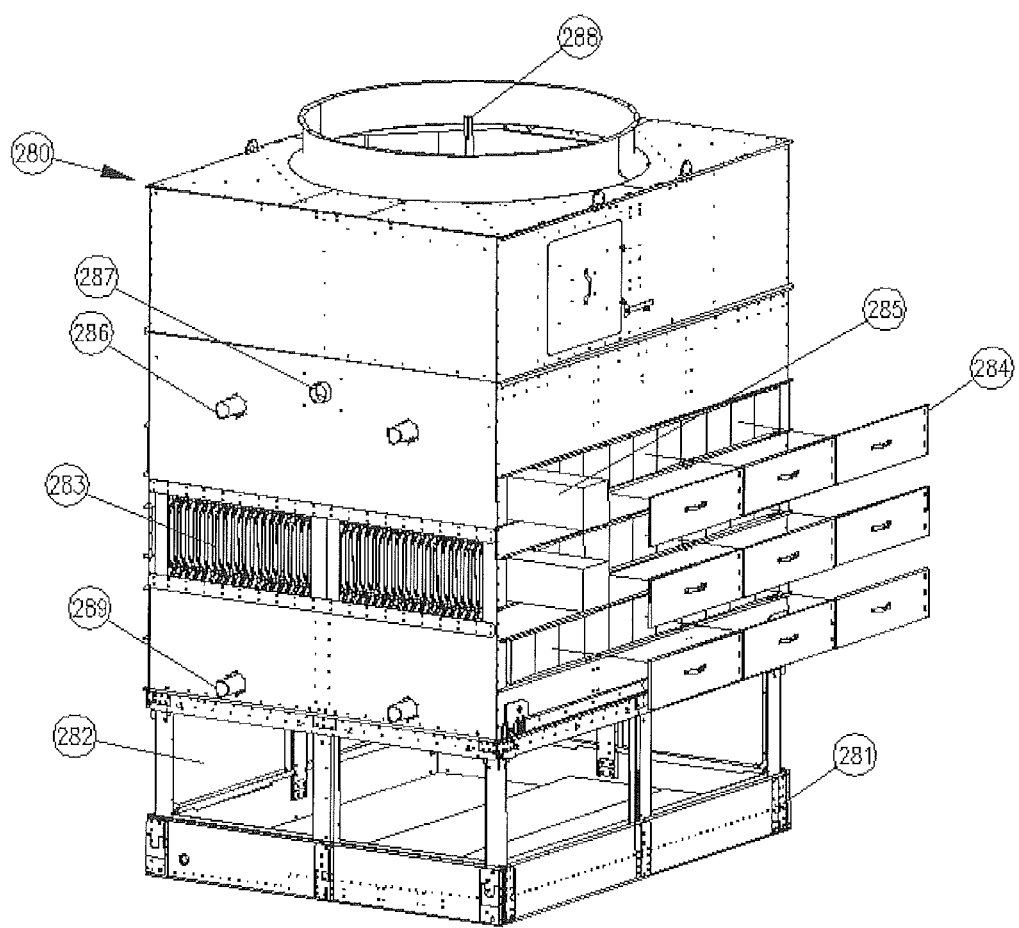
FIG. 8 is a perspective view of the fourth embodiment of a closed circuit cooling tower with an indirect heat exchange section with direct heat exchange sections in accordance with the present invention.

FIG. 8 is a perspective view of a cooling tower 280 in accordance with all the embodiments. More specifically, the cutaway views show that direct sections 285 may be easily removed for cleaning and replacement by opening or removing panels 284. Removal of panels allows access to clean indirect heat exchanger 283 as well. In embodiment 280, indirect coil 283 is shown with panels 284 removed for clarity where the large spray water cooling zones is located. A means for supporting the direct sections within the large spray water cooling zones in indirect coil 283 can be the direct section 285 resting on the indirect section, or sitting on small rods or other support means that are installed on top of indirect section 283 or any means to hang the direct section without it touching the indirect section if desired. The means to install the direct section within the large spray cooling zone is not a limitation. Spray water inlet 287 serves to distribute the spray water uniformly to the top of coil 283. Air inlet 282 is shown without the inlet louvers installed so the inside of cold water basin 281 can be seen. Coil inlet and outlet 289 are shown for connection for the incoming fluid to be cooled or condensed. Fan shaft 288, is connected to the fan and motor (not shown) and the fan system pulls air though the air inlet 282 through indirect coil 283 and direct sections 285 through the drift eliminators (not shown) and then generally upwards to the environment.

Figure 9:
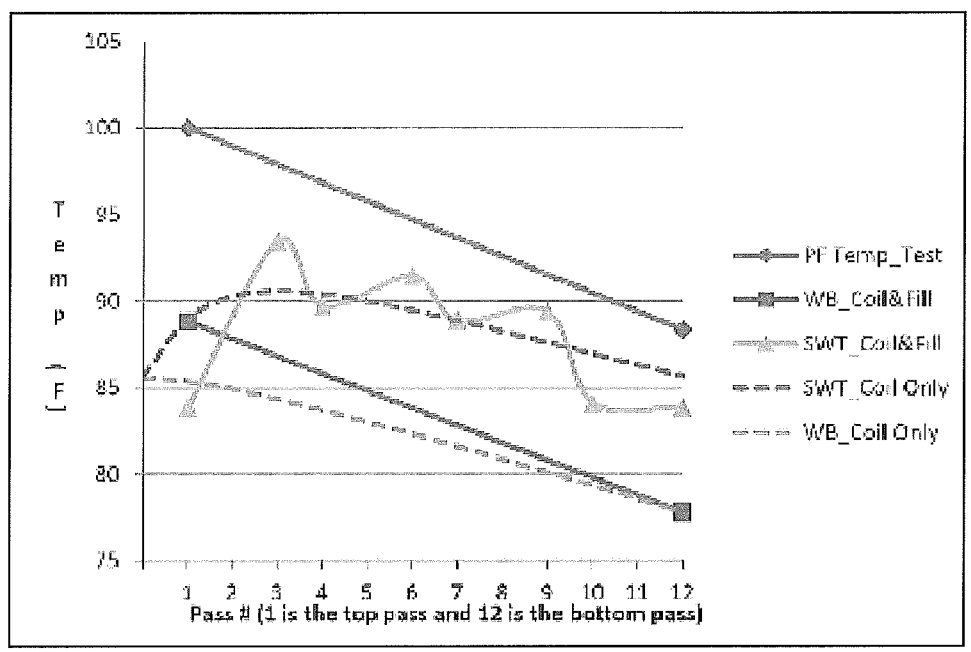
FIG. 9 is a chart of performance of heat exchangers constructed in accordance with the present invention.

FIG. 9 is a chart showing data from the prior art unit shown in FIG. 1 and the improved heat exchanger in the fourth embodiment employing indirect and direct sections. Specifically, the process fluid is represented in both prior art and the fourth embodiment by the top solid line (curve PF TempTest) showing the closed circuit cooling tower cooled the internal indirect coil fluid, in this case water, from 100 F to 88 F. It should be noted that in the prior art coil test, the top dotted line shows the spray water temperature at the top and bottom of the coil to be approximately 86 F while the maximum spray water temperature reached is approximately 91 F. However, note that with forth embodiment test data of the spray water temperature represented by the squiggly solid line, the spray water temperature at the top and bottom of the indirect coil section was 84 F and the maximum spray water temperature was 93 F. The improvement of the large spray water cooling zones can be seen as the spray water temperatures are both cooler displaying the ability to absorb more heat from the indirect tube runs yet overall the spray temperature was cooler as noted by the squiggly lines. The bottom two lines are the entering and leaving wet bulb temperatures. The bottom dotted line is from the prior art coil test showing the wet bulb entered at 78 F and left the unit at 89 F. The bottom solid line shows the wet bulb entering and leaving temperatures from test data from the fourth embodiment. Note that again the wet bulb entering temperature was 78 F yet the leaving wet bulb is higher than the prior art data leaving at 94 F. This increase in leaving wet bulb temperature shows the increased performance at identical operating test unit power draw (motors from both tests were both at 30 HP). In the fourth embodiment test data, because the spray water temperature profile is pushed up and the air wet bulb line (WB Coil&Fill) is also pushed up, this allows air to have a larger enthalpy increase. So by adding direct sections to a prior art indirect coil only product, the efficiency gain from having large spray water cooling zones between the tube runs can be seen to be much more beneficial than a slight loss in airflow caused by adding the direct sections. With fill decks sandwiched between coil tubes, the efficiency of heat rejection is increased as the spray water picks up more sensible heat and transfers it to air in both latent and sensible fashions.

What is claimed is:

1. A method of exchanging heat comprising the steps of:
providing an indirect evaporative heat exchange section,
the indirect heat exchange section conducting a fluid stream within a plurality of pathways,
the indirect heat exchange section comprising a top and a bottom,
distributing an evaporative liquid generally downward onto and through the indirect heat exchange section such that
indirect heat exchange occurs between the fluid stream within the plurality of pathways and the evaporative liquid,
moving air through the indirect section,
the air moving through the indirect heat exchange section exchanging heat with the evaporative liquid moving through the indirect heat exchange section and hence indirectly exchanging heat with the fluid stream within the plurality of pathways in the indirect section,
wherein the indirect heat exchange section is comprised of a series of serpentine tubes comprising run sections and vertically spaced apart return bend sections,
the series of serpentine tubes including at least one area having an increased vertical spacing between vertically adjacent run sections of the serpentine tubes, such increased vertical spacing formed by the vertically spaced apart return bend sections, and providing a direct heat exchange section in one or more of the areas in the indirect heat exchange section having increased vertical spacing between vertically adjacent run sections of the series of serpentine tubes.

2. The method of exchanging heat of claim 1, further comprising:
collecting substantially all of the evaporative liquid that exits the indirect heat exchange section, and
pumping the collected evaporative liquid upwardly such that
the collected evaporative liquid can be distributed generally downward onto and through the indirect heat exchange section.

3. The method of exchanging heat of claim 1 wherein
the air moving through the indirect heat exchange section moves generally counter-current to the direction of flow of the evaporative liquid through the indirect heat exchange section.

4. The method of exchanging heat of claim 1 wherein the air moving through the indirect heat exchange section moves generally cross-current to the direction of flow of the evaporative liquid through the indirect heat exchange section.

5. The method of exchanging heat of claim 1 wherein the direct heat exchange section comprises a fill assembly located in one of the areas in the indirect heat exchange section having increased vertical spacing between vertically adjacent run sections of the series of serpentine tubes.

6. The method of exchanging heat of claim 1 further comprising:
a support frame whereby the direct heat exchange section is supported such that it does not contact the indirect heat exchange section.

7. The method of exchanging heat of claim 1 further comprising:
the direct heat exchange section is supported by being in contact with the indirect heat exchange section.

8. The method of exchanging heat of claim 1 wherein the increased vertical spacing between tube runs comprises: one 90 degree bend, one vertical length of tube run followed by another 90 degree bend.

9. The method of exchanging heat of claim 1 wherein the increased vertical spacing between tube runs forms a generally rectangular shape.

10. The method of exchanging heat of claim 1 wherein the increased vertical spacing between tube runs forms a generally triangular shape.

11. The method of exchanging heat of claim 1 wherein the direct section evaporates evaporative liquid at a rate of 110% to 400% more than that in the indirect section.

12. The method of exchanging heat of claim 1 wherein the increased vertical spacing formed by the vertically spaced apart return bend sections is about 12 inches (30.48 cm).

13. The method of exchanging heat of claim 1 wherein the increased vertical spacing formed by the vertically spaced apart return bend sections is from 2 inches (5.08 cm) to 60 inches (152.4 cm).

14. The method of exchanging heat of claim 1 wherein the direct heat exchange section is comprised of generally rectangular fill sheets.

15. The method of exchanging heat of claim 1 wherein the direct heat exchange section is comprised of generally triangular fill sheets.

16. The method of exchanging heat of claim 1 wherein the increased vertical spacing formed by the vertically spaced apart return bend sections is at least 2 inches (5.08 cm).

17. The method of exchanging heat of claim 1 wherein the direct heat exchange section is comprised of removable fill sheet sections.

18. The method of exchanging heat of claim 1 wherein the airflow is operable between 0 to 100% flow rate.

19. The method of exchanging heat of claim 1 wherein the same top and bottom indirect heat exchanger are connected with vertical runs between two 90 degree elbows.

20. A method of exchanging heat comprising the steps of:
providing an indirect heat exchange section,
the indirect heat exchange section conducting a fluid stream within a plurality of pathways,
the indirect heat exchange section comprising a top and a bottom,
moving air through the indirect section,
the air moving through the indirect heat exchange section exchanging heat with the fluid stream within the plurality of pathways in the indirect section,
wherein the indirect heat exchange section is comprised of a serpentine coil assembly comprised of a series of serpentine tubes comprising run sections and return bend sections, certain of the return bend sections having a greater vertical spacing than other of the return bend sections,
the serpentine coil assembly including at least one area having an increased vertical spacing between vertically adjacent run sections, such increased vertical spacing formed by the return bend sections having a greater vertical spacing,
an inlet header and
an outlet header operatively connected to the series of serpentine tubes such that the fluid stream can pass into the series of serpentine tubes and out from the series of serpentine tubes,
and providing a direct heat exchange section in one or more of the areas in the indirect heat exchange sections having increased vertical spacing between vertically adjacent run sections of the series of serpentine tubes.

21. The method of exchanging heat of claim 20 wherein the direct heat exchange section comprises a fill assembly located in one of the areas in the indirect heat exchange section having increased vertical spacing between vertically adjacent run sections of the series of serpentine tubes.

22. A method of exchanging heat comprising the steps of:
providing an indirect evaporative heat exchange section,
the indirect heat exchange section conducting a fluid stream within a plurality of pathways,
the indirect heat exchange section comprising a top and a bottom,
moving air through the indirect section,
the air moving through the indirect heat exchange section exchanging heat with the evaporative liquid moving through the indirect heat exchange section and hence indirectly exchanging heat with the fluid stream within the plurality of pathways in the indirect section,
wherein the indirect heat exchange section is comprised of a series of serpentine coils comprising run sections and return bend sections, and certain of the return bend sections having a greater vertical spacing than other of the return bend sections,
the increased height return bend section providing increased vertical spacing between vertically adjacent run sections of the serpentine coils,
an inlet header and
an outlet header operatively connected to the series of serpentine coils
such that the fluid stream can pass into the series of serpentine coils and out from the series of serpentine coils,
and providing a direct heat exchange section in one or more of the areas in the indirect heat exchange sections having increased vertical spacing between vertically adjacent run sections of the series of serpentine coils.

23. The method of exchanging heat of claim 22 wherein a system is provided to distribute an evaporative liquid downwardly and through the second indirect heat exchange section from a position above the top of the indirect heat exchange section.

24. The method of exchanging heat of claim 22 wherein the direct heat exchange section comprises a fill assembly located in one of the areas in the indirect section having increased vertical spacing between vertically adjacent run sections of the series of serpentine coils.

25. A method of exchanging heat comprising the steps of:
providing an indirect evaporative heat exchange section,
the indirect heat exchange section conducting a fluid stream within a plurality of pathways,
the indirect heat exchange section comprising a top and a bottom,
distributing an evaporative liquid generally downward onto and through the indirect heat exchange section such that
indirect heat exchange occurs between the fluid stream within the plurality of pathways and the evaporative liquid,
wherein the indirect heat exchange section is comprised of a series of serpentine tubes comprising run sections and vertically spaced apart return bend sections,
the series of serpentine tubes including at least one area having an increased vertical spacing between vertically adjacent run sections of the serpentine tubes, such increased vertical spacing formed by the vertically spaced apart return bend sections, and providing a direct heat exchange section in one or more of the areas in the indirect heat exchange section having increased vertical spacing between vertically adjacent run sections of the series of serpentine tubes.

26. The method of exchanging heat of claim 25, further comprising:
collecting substantially all of the evaporative liquid that exits the indirect heat exchange section, and
pumping the collected evaporative liquid upwardly such that
the collected evaporative liquid can be distributed generally downward onto and through the indirect heat exchange section.

27. The method of exchanging heat of claim 25, further comprising:
moving air through the indirect section,
the air moving through the indirect heat exchange section exchanging heat with the evaporative liquid moving through the indirect heat exchange section and hence indirectly exchanging heat with the fluid stream within the plurality of pathways in the indirect section.

* * * * *